United States Patent [19]

Tobis

[11] Patent Number: 4,892,277
[45] Date of Patent: Jan. 9, 1990

[54] WIRE SUPPORT RACK FOR DISPOSABLE PLASTIC TRASH BAGS

[76] Inventor: Mark A. Tobis, 1195 Sanders Rd., Northbrook, Ill. 60062

[21] Appl. No.: 261,105

[22] Filed: Oct. 24, 1988

[51] Int. Cl.$^4$ ............................................. B65B 67/12
[52] U.S. Cl. ..................................................... 248/101
[58] Field of Search .................... 248/95–101, 248/153, 210, 211, 238, 214; 182/129, 122

[56] References Cited

U.S. PATENT DOCUMENTS

| | | | |
|---|---|---|---|
| 323,141 | 7/1885 | Hatz | 248/99 |
| 1,664,658 | 4/1928 | Blazer | 248/101 X |
| 1,875,107 | 8/1932 | Mueller | 224/46 R |
| 2,062,023 | 11/1936 | Gosselin | 248/99 |
| 2,579,674 | 12/1951 | Johnson | 248/99 |
| 2,894,708 | 7/1959 | Kaplan | 248/99 |
| 3,796,402 | 3/1974 | Trotta | 248/101 X |
| 4,050,492 | 9/1974 | Veilleux | 248/99 |
| 4,157,801 | 6/1979 | Elmer | 248/101 X |
| 4,452,416 | 6/1984 | Templeton | 248/451 X |
| 4,672,703 | 6/1987 | Frazier | 248/153 X |

*Primary Examiner*—Alvin C. Chin-Shue
*Attorney, Agent, or Firm*—Myers & Ehrlich

[57] ABSTRACT

A holder for mounting a plastic bag from a mower guide having a transverse handle and a pair of downwardly and forwardly extending legs, the holder having a rectangular frame defining a vertical opening for admitting a plastic bag therethrough which is folded along its upper edge about the fame and held thereon by a clasp which is mounted on an upright leg connected to the frame, the upright leg is hooked at its upper end over the handle and the side portions of the frame being provided with laterally extending hooks which hook about the legs of the mower guide, the frame being resilient and the laterally extending hooks being stretchable to resiliently embrace said side portion to hold the frame and bag assembly from bouncing loose when moving with the mower.

1 Claim, 1 Drawing Sheet

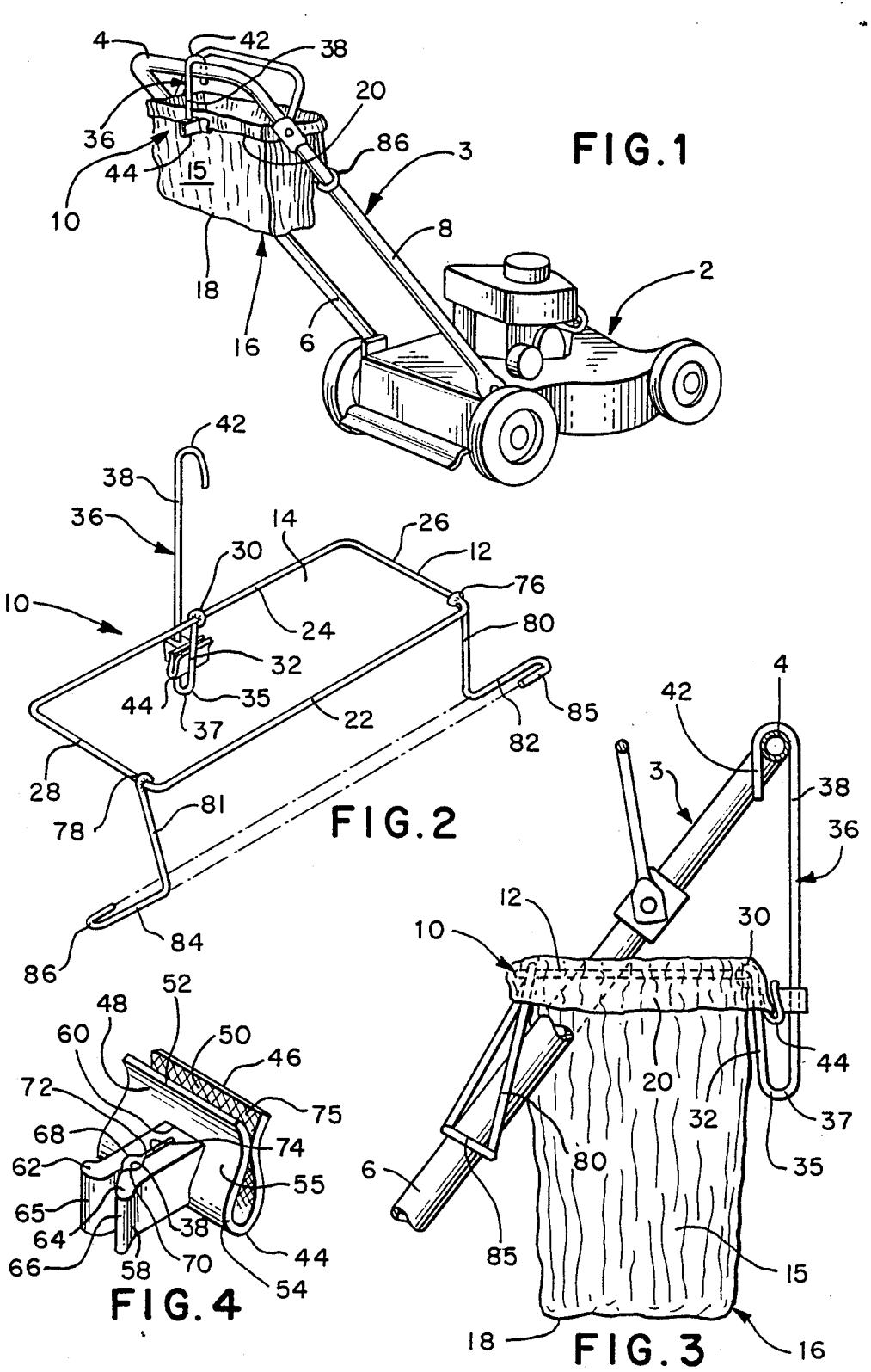

WIRE SUPPORT RACK FOR DISPOSABLE PLASTIC TRASH BAGS

BACKGROUND OF THE INVENTION

This invention relates to a support rack for mounting plastic bags from the handle of a mower.

The support rack not only holds the bag open but provides a novel and simple attachment to the handle of a mower and like device.

Frequently it is necessary, as a lawn is being mowed, to pick up trash laying on the lawn, such as branches from trees, sticks, paper, weeds etc. There presently is not available any simple, inexpensive handy device in the market for collecting such debris.

SUMMARY OF THE INVENTION

This invention is directed to a novel bag holder from the cross-bar handle and the side connector bars of a typical walk-behind mower.

The principal object of the invention is to provide a skeletal frame for mounting a plastic bag from the mower handle.

More specifically a primary object is to provide a bag holder which maintains the bag in open position and obtains a quick attachment to the mower handle.

A further object is to provide a bag holder which comprises a frame with an opening for admitting a bag therethrough and about which an upper fold is wrapped and secured to hold the bag open.

A different object is to provide a clip type holder on a portion of the frame for releasably securing the fold to the frame.

The novel holder provides in addition to the frame an upright hook for hooking over the cross-bar of the mover handle and laterally extending hooks for hooking about the downwardly extending side portions of the handle.

These and other objects and advantages inherent in and encompassed by the invention will become more apparent from the specification and drawings wherein.

FIG. 1 is a side perspective view of a mower and handle with the bag and frame device mounted thereon.

FIG. 2 is a top front perspective view of the bag mounting frame.

FIG. 3 is an enlarged vertical sectional view taken substantially on line 3—3 of FIG. 1, and FIG. 4 is an enlarged perspective of the bag holding clip.

DESCRIPTION OF THE INVENTION

As seen in FIG. 1, the mower 2 comprises a handle 3 which includes a cross-bar 4, and a pair of spaced side legs 6, 8 which extend downwardly and forwardly to the mower and are connected thereto in conventional manner.

A bag holder 10 is mounted on the handle and comprises a skeletal perimetrical rectangular wire frame 12 defining a bag-admitting opening 14 therein for reception of the body portion 15 of a bag 16 therethrough. The bag 16 has a closed bottom 18 and has a fold 20 at its upper end draped over the frame 12.

Frame 12 has front and rear bars 22, 24 and interconnecting side bars 26, 28.

The rear bar 24 is fastened medially between its ends to the upper end 30 of the front leg 32 of a U-shaped lower portion 35 of an upright hook member 36. Portion 35 has a lower bight 37 which joins with the lower ends of leg 32 and of an upright rear leg 38 of hook member 36. The upright leg 38 has a hook 42 formed at its upper end which hooks over the cross-bar 4 of the mover handle.

A flexible plastic clip 44 is attached to the lower end of the leg 38 within the U. The clip has a pair of opposed lips 46, 48 with upwardly divergent portions 50, 52 for easily admitting the fold portion of the bag between the abutting separable clamping lips 46, 48. The lips join a body portion 54 which with the lips is in the form of a hair pin. The back section 55 of the body portion 54 of the clip is joined to a mounting 58 which has a base portion 60 integral with section 55. The jaws 62, 64 are spreadable apart by wedging the curved sections 65, 66 against the leg 38 until it enters the opposed notches 68, 70 formed on the interior surfaces 72, 74 thereof.

The jaws 62, 64 are because of the flexibility of the material from which they are made, biased toward each other and tightly grasp the cylindrical leg 38.

The interior of the lips 46, 48 may be knurled or serrated as at 75 to obtain a positive purchase on the flap or fold of the plastic bag. The bag is removable by pulling on the flap adjacent to the clip and unfolding the flap from the frame.

If will be noted that the side portion 26, 28 are joined at 76, 78 adjacent to their forward ends to the upper ends of downwardly extending legs 80, 81 which at their lower ends are formed with oppositely direct laterally extending coaxial extensions 82, 84 provided at their distal ends with hooks 85, 86. Hook 85 is positioned in front of extension 82 and hook 86 is located behind extension 84.

The hooks 85 and 86 are hooked about legs 6 and 8 thus providing a three point suspension with hook 42 for the holder 10.

I claim:

1. A mounting for a conventional plastic bag having a body portion and an upper foldable portion from a mower handle having a hand held cross-bar and a pair of side members extending downwardly and forwardly to the mower comprising:,
    a peripheral frame comprising an endless quadrilateral wire a hoop adapted to receive the body of the bag therethrough with an upper portion folded thereover;
    a hanger with a U-shaped lower portion comprising laterally spaced inner and outer vertical legs;
    means securing the upper end of the inner leg to the hoop;
    a hook at the upper end of the other leg adapted to hook over the cross-bar; and
    a releasable securement mounted between said legs for holding the folded portion of the bag entered therein and a pair of tensioning hoots extending laterally from said side members for hooking thereabout.

* * * * *

UNITED STATES PATENT AND TRADEMARK OFFICE
CERTIFICATE OF CORRECTION

PATENT NO. : 4,892,277
DATED : Jan. 9, 1990
INVENTOR(S) : Mark A. Tobis

It is certified that error appears in the above-identified patent and that said Letters Patent is hereby corrected as shown below:

Column 2, line 50 "a" should be deleted;
line 61 "hoots" should read --hooks--.

Signed and Sealed this

First Day of January, 1991

Attest:

HARRY F. MANBECK, JR.

*Attesting Officer*  *Commissioner of Patents and Trademarks*